US012594618B2

(12) United States Patent
Sickels et al.

(10) Patent No.: US 12,594,618 B2
(45) Date of Patent: Apr. 7, 2026

(54) WELDING POWER SUPPLIES AND USER INTERFACES FOR WELDING POWER SUPPLIES

(71) Applicant: Illinois Tool Works Inc., Glenview, IL (US)

(72) Inventors: Darrell Lee Sickels, Troy, OH (US); Craig Steven Knoener, Appleton, WI (US)

(73) Assignee: Illinois Tool Works Inc.

( * ) Notice: Subject to any disclaimer, the term of this patent is extended or adjusted under 35 U.S.C. 154(b) by 594 days.

(21) Appl. No.: 16/998,537

(22) Filed: Aug. 20, 2020

(65) Prior Publication Data

US 2021/0069814 A1    Mar. 11, 2021

Related U.S. Application Data

(60) Provisional application No. 62/897,778, filed on Sep. 9, 2019.

(51) Int. Cl.
B23K 9/10        (2006.01)
B23K 9/095       (2006.01)

(52) U.S. Cl.
CPC .......... B23K 9/1062 (2013.01); B23K 9/0953 (2013.01)

(58) Field of Classification Search
CPC ...... B23K 9/09; B23K 9/0953; B23K 9/0956; B23K 9/10; B23K 9/1056; B23K 9/1062
USPC ....................................................... 219/130.5
See application file for complete search history.

(56) References Cited

U.S. PATENT DOCUMENTS

| | | | |
|---|---|---|---|
| 5,278,390 | A | 1/1994 | Blankenship |
| 6,091,048 | A | 7/2000 | Lanouette |
| 6,167,328 | A | 12/2000 | Takaoka |
| 6,649,870 | B1 | 11/2003 | Barton |
| 6,735,540 | B2 | 5/2004 | Pedrazzini |

(Continued)

FOREIGN PATENT DOCUMENTS

| | | |
|---|---|---|
| CN | 102239025 | 11/2011 |
| CN | 107708908 | 2/2018 |

(Continued)

OTHER PUBLICATIONS

European Office Action Appln No. 2640543 dated Feb. 11, 2021.

(Continued)

*Primary Examiner* — Sang Y Paik
(74) *Attorney, Agent, or Firm* — MCANDREWS HELD & MALLOY, LTD.

(57) ABSTRACT

Disclosed example power supplies, user interfaces, and methods are provided for simple and intuitive setup for configurable and/or default settings for a welding power source and/or wire feeder. The welding parameters may correspond to a default and/or factory setting that represents empirically adduced values for a particular welding procedure (e.g., based on material type, electrode diameter, welding process and/or tool, etc.). The welding parameters may additionally or alternatively be configured for a particular purpose. Once a configurable setting has been selected, the configurable setting controls the system output. Furthermore, once a configurable set of welding parameters has been established, the operator may return to the default settings by resetting the welding parameters.

19 Claims, 11 Drawing Sheets

(56) References Cited

U.S. PATENT DOCUMENTS

| | | | | |
|---|---|---|---|---|
| 8,115,138 | B2 * | 2/2012 | Jacovetty | B23K 9/1062 |
| | | | | 700/212 |
| 10,661,372 | B2 * | 5/2020 | Ulrich | B23K 9/0953 |
| 2007/0155347 | A1 | 7/2007 | Heuermann | |
| 2009/0173726 | A1 | 7/2009 | Davidson et al. | |
| 2010/0108654 | A1 | 5/2010 | Ulrich | |
| 2016/0346861 | A1 | 12/2016 | Davidson et al. | |
| 2017/0165775 | A1 | 6/2017 | Knoener | |
| 2017/0334012 | A1 | 11/2017 | Baus | |
| 2017/0355036 | A1 * | 12/2017 | Rozmarynowski | B23K 9/125 |
| 2018/0095640 | A1 * | 4/2018 | Albright | G06F 3/04847 |
| 2018/0178305 | A1 * | 6/2018 | Cole | B23K 9/0286 |

FOREIGN PATENT DOCUMENTS

| | | |
|---|---|---|
| CN | 107891215 | 4/2018 |
| CN | 108698148 | 10/2018 |
| DE | 102017009043 | 4/2018 |

OTHER PUBLICATIONS

Canadian Office Action Appln No. 3,091,396 dated Feb. 27, 2024.
Tecna, "Welding Control Unit TE101 User Manual", Man 4264, pp. 1-8, http://spotweldinc.com/PDFsrrecna/TE101_user-manual_EN_ES_sm.pdf, 2013.

* cited by examiner

114

114

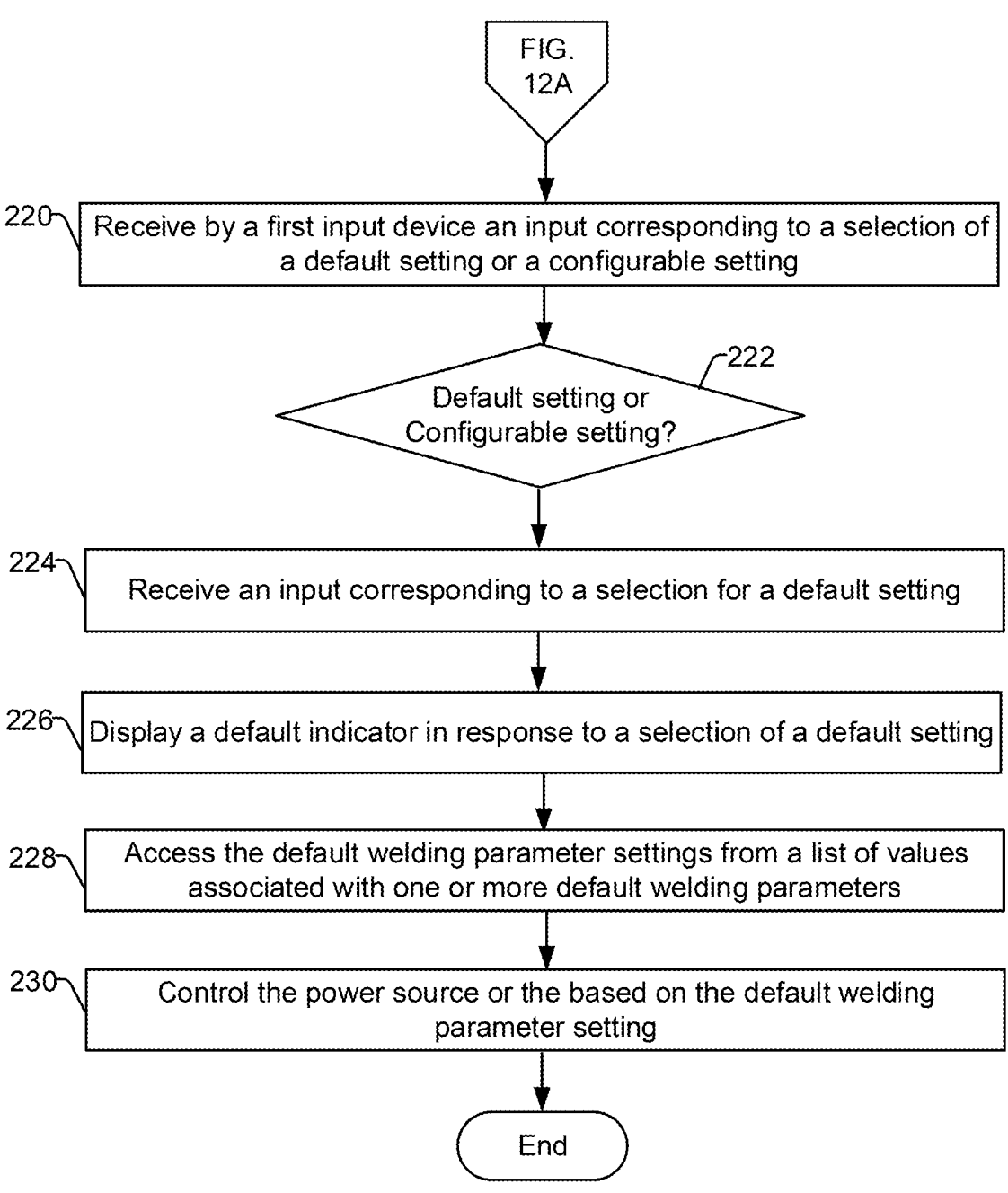

220 — Receive by a first input device an input corresponding to a selection of a default setting or a configurable setting 222 — Default setting or Configurable setting?

224 — Receive an input corresponding to a selection for a default setting

226 — Display a default indicator in response to a selection of a default setting 228 — Access the default welding parameter settings from a list of values associated with one or more default welding parameters 230 — Control the power source or the based on the default welding parameter setting End

FIG. 12B

WELDING POWER SUPPLIES AND USER INTERFACES FOR WELDING POWER SUPPLIES

CROSS REFERENCE TO RELATED APPLICATIONS

This application is a Non-Provisional Patent Application which claims priority to U.S. Provisional Patent Application No. 62/897,778, entitled "Welding Power Supplies And User Interfaces For Welding Power Supplies", filed Sep. 9, 2019, the contents of which are herein incorporated by reference in their entirety.

BACKGROUND

A common metal welding technique employs the heat generated by electrical arcing to transition a work piece to a molten state, to facilitate a welding process. One technique that employs this arcing principle is wire feed welding. If the welding device is properly adjusted, the wire feed advancement and arcing cycle progresses smoothly, providing a good weld.

Traditionally, during a welding operation, an operator selects the level and types of resources provided to the weld location, depending, of course, on the particulars of the weld and the materials being welded. Different kinds of wire electrode, however, perform well at different operational settings of the welding device.

Conventionally, welding devices rely on the knowledge and acumen of the operator to select the most appropriate voltage and wire feed settings for the wire electrode being used and weld conditions. Unfortunately, in many cases, the weld operator is a novice to the field, especially in the case of portable welding devices. If the operator does not properly adjust the voltage and wire feed speed settings, the arcing may not be sufficient to produce a good weld, or any weld at all. Furthermore, in traditional devices, the wire feed speed control and the voltage control are either independent of one another or directly linked, making it difficult for the operator to adjust the welding parameters to achieve a desired set of parameters.

SUMMARY

Welding power supplies and user interfaces for welding power supplies are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 12A and 12B provide a flowchart representative of example machine-readable instructions that may be executed by the example system of FIGS. 1A-1C to implement the welding process including Auto-Set welding parameters, in accordance with aspects of this disclosure.

The figures are not necessarily to scale. Where appropriate, similar or identical reference numbers are used to refer to similar or identical components.

DETAILED DESCRIPTION

Figure 1A:
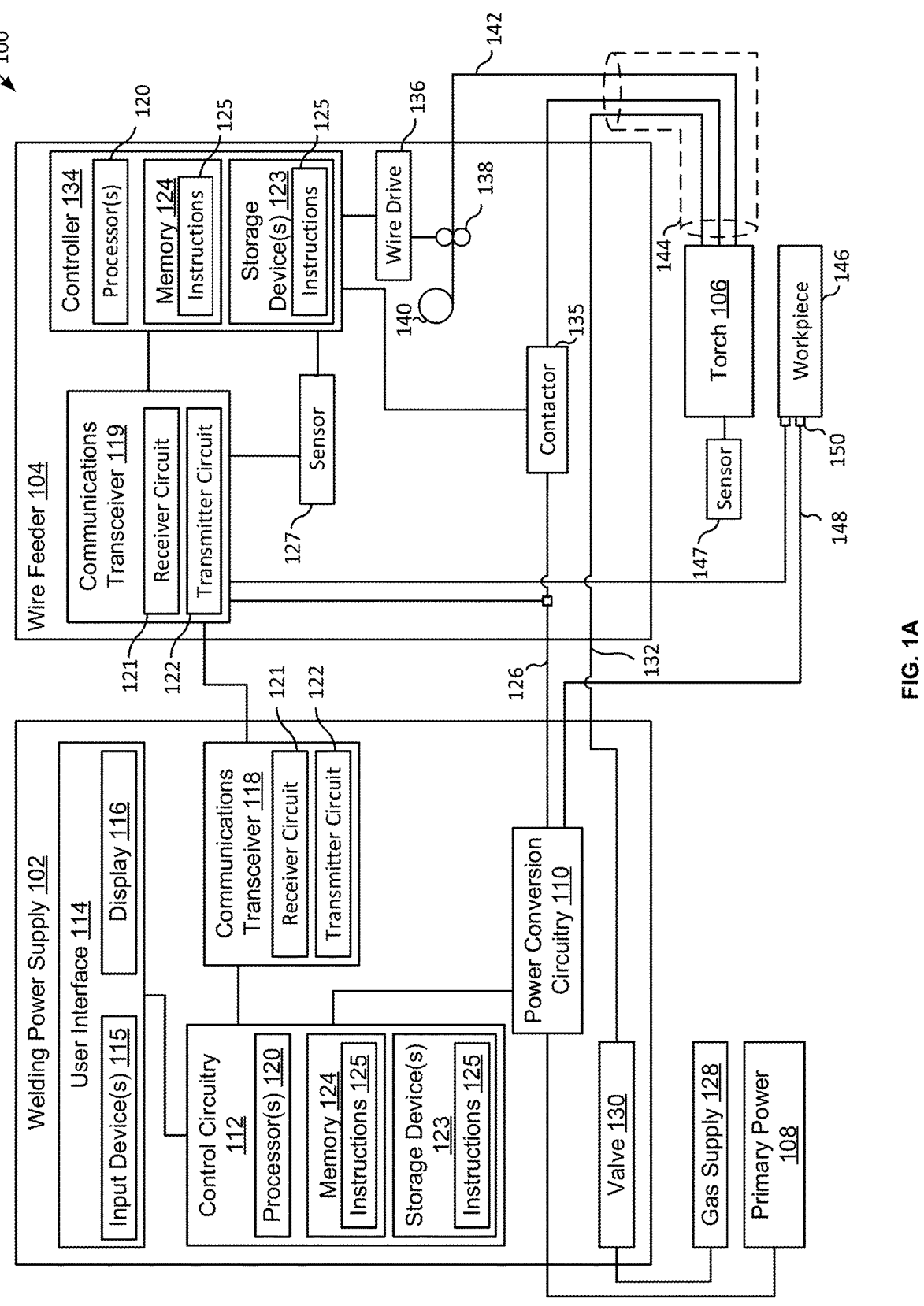
FIG. 1A is a schematic diagram of an example welding system including a power supply having a user interface to configure a welding process, in accordance with aspects of this disclosure.

Disclosed example power supplies, user interfaces, and methods allow for simple and intuitive setup for configurable and/or default settings for a welding power source and/or wire feeder.

In some examples, a welding system includes a power source to deliver power to a welding torch based on one or more welding parameters (e.g., voltage, current, power, wire feed speed, gas flow rate, pulse rate, workpiece thickness, workpiece material type, electrode type, welding process, travel speed, arc length, or joint type, etc.). As disclosed herein, the welding parameters may correspond to a default and/or factory setting that represents empirically adduced values for a particular welding procedure (e.g., based on material type, electrode diameter, welding process and/or tool, etc.). The welding parameters may be configured for a particular purpose. In other words, an interface (such as an Auto-Set button) can be provided to allow an operator to enable adjustment of the one or more parameters. A second input device (such as a selector switch, knob, touchscreen input) receives an input from the operator relating to a desired change in a value of the one or more welding parameters. Once a configurable setting has been selected, the configurable setting controls the system output in the absence of additional inputs. Having established a controlling set of welding parameters, a controller controls the power source to deliver power or the welding wire feeder to advance the electrode wire based on the controlling, preferred welding parameter settings.

Furthermore, once a configurable set of welding parameters has been established, the operator may return to the default settings by resetting the welding parameters. For instance, the operator can provide an input corresponding to a selection for a return to the default welding parameter setting, such as using the Auto-Set button. The controller can then access the default welding parameter settings from a list of values associated with one or more default welding parameters (e.g., corresponding to best practices, empirically obtained values, etc.). Having been successfully reset, the power source delivers power or the welding wire feeder to advance the electrode wire based on the default welding parameter setting.

The status of the welding parameters (e.g., whether the setting corresponds to a default setting or configured setting) and the value of the parameter can be displayed on a display device presented to the operator. For example, the display can include an information bar to display graphics or text to the operator corresponding to instructions or responses to aid in adjusting the welding parameter settings.

In disclosed examples, a welding system includes a power source configured to deliver power to a welding torch based on one or more welding parameters, a welding wire feeder configured to advance a wire electrode to the welding torch based on the one or more welding parameters, and an interface. The interface includes a first input device configured to receive an input corresponding to a selection of a default setting or a configurable setting for the one or more welding parameters, a display device configured to display a default indicator in response to selection of a default setting or a configurable indicator in response to a selection of a configurable setting, and a second input device configured to receive an input relating to a change in value of the one or more welding parameters. Control circuitry is included and configured to receive an input corresponding to a selection for a configurable setting from the first input device, receive an input corresponding to a change in value for a welding parameter of the one or more welding parameters from the second input device, adjust a value of a welding parameter from a default welding parameter value of the one or more welding parameters based on the received change, assign the adjusted value as a preferred welding parameter setting and store the adjusted value in a list of values associated with one or more preferred welding parameters, control the power source to deliver power or the welding wire feeder to advance the electrode wire based on the preferred welding parameter setting, receive an input corresponding to a selection for a default welding parameter setting from the first input device, access the default welding parameter settings from a list of values associated with one or more default welding parameters, and control the power source to deliver power or the welding wire feeder to advance the electrode wire based on the default welding parameter setting.

In some examples, the control circuitry applies one or more adjustment boundaries such that an adjustment to the default welding parameter value is limited by the one or more adjustment boundaries. In examples, the one or more adjustment boundaries is five percent of the default welding parameter value. In some examples, the one or more adjustment boundaries corresponds to a predetermined value.

In examples, the interface includes a graphical range indicator to represent a default welding parameter range or a welding parameter threshold range, such that a high value limit is represented on a first side of the default welding parameter range and a low value limit is represented on a second side of the default welding parameter range opposite the first side.

In some examples, the interface includes a graphical reticle indicating selection of a default welding parameter. In examples, the interface includes a graphical band indicating selection of a configurable welding parameter. In some examples, a location of the graphical band on the graphical range indicator corresponds to a value of the welding parameter relative to the default welding parameter. In examples, a type of input is one of a tap, a double tap, or holding the input device for a predetermined amount of time, the type of input corresponding to a different function of a respective device.

In some examples, the control circuitry is further configured to control the power source to deliver power according to one or more welding processes, each welding process of the one or more welding processes corresponding to one or more configurable settings. In examples, the one or more welding parameters includes one or more of voltage, current, power, wire feed speed, gas flow rate, pulse rate, workpiece thickness, workpiece material type, electrode type, welding process, travel speed, arc length, or joint type.

In disclosed examples, a welding system includes a power source configured to deliver power to a welding torch based on one or more welding parameters, a welding wire feeder configured to advance a wire electrode to the welding torch based on the one or more welding parameters, wherein the one or more welding parameters includes a voltage or a wire feed speed, an interface. The interface includes a first input device configured to receive an input corresponding to a selection of a default setting or a configurable setting for the one or more welding parameters, a display device configured to display a default indicator in response to selection of a default setting or a configurable indicator in response to a selection of a configurable setting. A voltage selection knob receives an input relating to the voltage provided to the welding torch, and a wire feed speed selection knob receives an input relating to the wire feed speed from the welding wire feeder. Control circuitry receives an input corresponding to a selection for a configurable setting from the first input device, receives an input corresponding to a change in value for one or more of the voltage or the wire feed speed, adjusts the value of the voltage or the wire feed speed based on the received change, assigns the adjusted value of the voltage or the wire feed speed as a preferred welding parameter setting and store the adjusted value in a list of values associated with one or more preferred welding parameters, and controls the power source to deliver power or the welding wire feeder to advance the electrode wire based on the preferred welding parameter setting.

In some examples, the control circuitry receives an input corresponding to a selection for a default welding parameter setting from the first input device, accesses the default welding parameter settings from a list of values associated with one or more default welding parameters, and controls the power source to deliver power or the welding wire feeder to advance the electrode wire based on the default welding parameter setting.

In some examples, an information bar to display graphics or text to the operator, the graphics or text providing instructions or responses corresponding to the user input. In examples, the interface includes a welding process type input device configured to receive an input relating to a welding process type, wherein the range of values for the power output and the default welding parameter values are calculated based at least in part on the welding process type.

In some examples, the welding process type input device includes a selectable option of one or more of a metal inert gas (MIG) or a tungsten inert gas (TIG) welding process as the welding process type. In examples, the interface includes a workpiece input device configured to receive input relating to the material thickness of the workpiece, wherein the control circuitry is further configured to determine the default welding parameter values based on the material thickness.

In some examples, the interface includes a first graphical range indicator with an indication of a present value of the voltage, and a second graphical range indicator with an indication of a present value of the wire feed speed. In examples, the control circuitry is further configured to update the indication of the present value of the parameter for the voltage in response to an input received via the voltage input device and to update the indication of the present value of the wire feed speed in response to an input received via the wire feed speed input device.

In some examples, the control circuitry is further configured to apply one or more adjustment boundaries such that an adjustment to the default welding parameter value is limited by the one or more adjustment boundaries.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

As used herein, the term "welding program" includes at least a set of welding parameters for controlling a weld. A welding program may further include other software, algorithms, processes, or other logic to control one or more welding-type devices to perform a weld.

Turning now to the drawings, FIG. 1A is a block diagram of an example welding system 100 having a welding-type power supply 102, a wire feeder 104, and a welding torch 106. The welding system 100 powers, controls, and supplies consumables to a welding application for simple and intuitive setup for configurable and/or default settings for the power supply 102 and/or wire feeder 104. In other words, an interface (such as an Auto-Set button) can be provided to allow an operator to adjust one or more welding parameters. A second input device (such as a selector switch, knob, touchscreen input) receives an input from the operator relating to a desired change in a value of the one or more welding parameters, to establish a configurable setting to control the system output in the absence of additional inputs. Furthermore, once a configurable set of welding parameters has been established, the operator may return to the default settings by resetting the welding parameters.

In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1A includes a wire feeder 104 (e.g., for GMAW or FCAW welding), the wire feeder 104 may be replaced by any other type of remote accessory device, such as a stick welding and/or TIG welding remote control interface that provides stick and/or TIG welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation. One or more lists or look up tables may be provided, and/or network connections to various databases available to inform decision-making, such as to access preferred welding parameters, to store updated welding parameter settings, etc.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102.

The example wire feeder 104 also includes a communications transceiver 119, which may be similar or identical in construction and/or function as the communications transceiver 118. While communication over a separate communications cable is illustrated in FIG. 1A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and power is initiated and stopped by the power supply 102. In some examples, one or more sensors 127 are included with or connected to in the wire feeder 102 to monitor one or more welding parameters (e.g., power, voltage, current, wire feed speed, etc.) to inform the controller 134 during the welding process. In some examples, one or more sensors are included in the welding power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process.

Figure 1B:
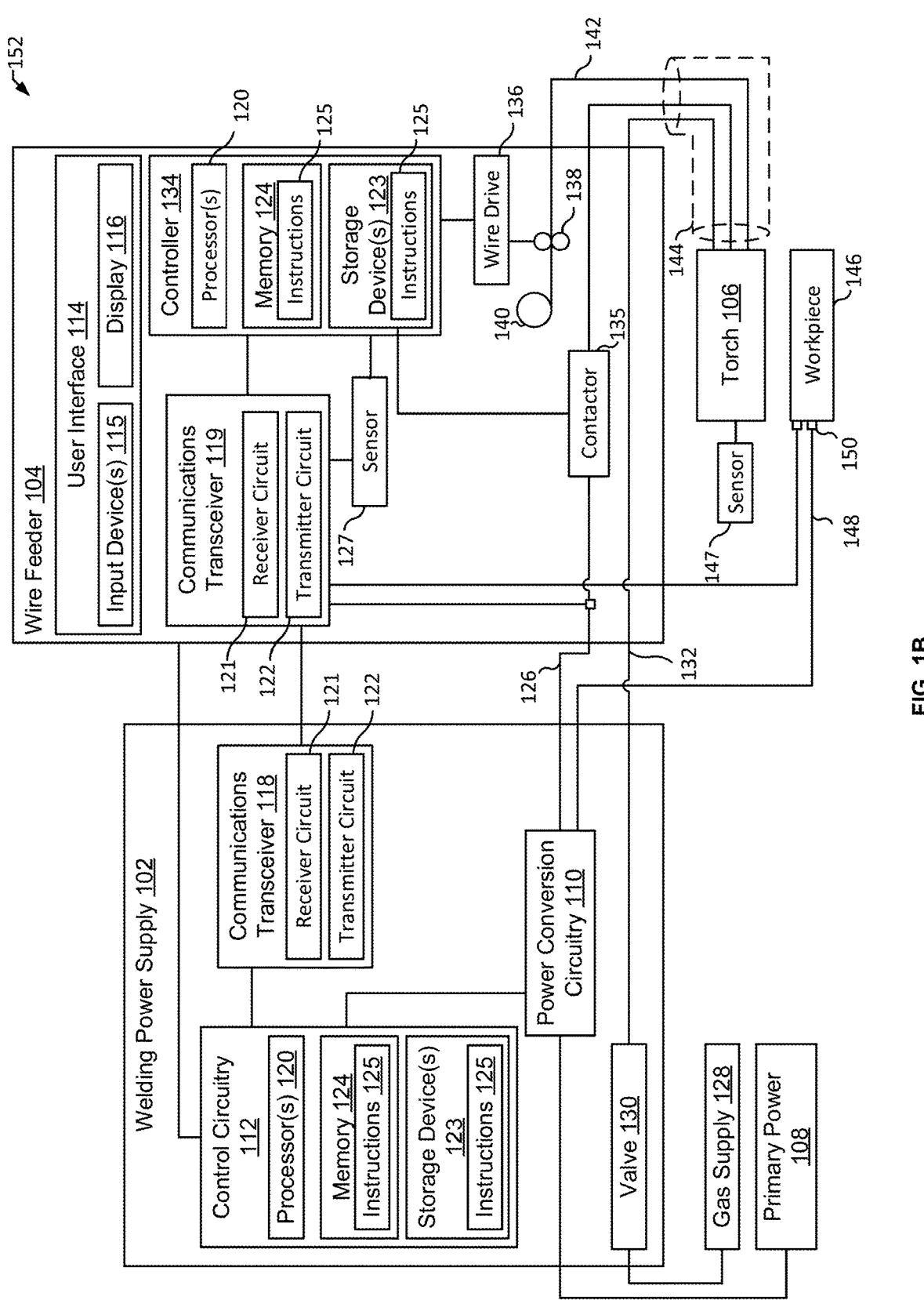
FIG. 1B is a schematic diagram of another example welding system including a wire feeder having a user interface to configure a welding process, in accordance with aspects of this disclosure.

FIG. 1B is a schematic diagram of another example welding system 152 in which the wire feeder 104 includes the user interface 114 in addition or as an alternative to the user interface on the welding power supply 102. In the example of FIG. 1B, the control circuitry 134 of the wire feeder 104 implements the determinations of the welding program and welding parameters which are described with reference to the control circuitry 112 of FIG. 1A.

Figure 1C:
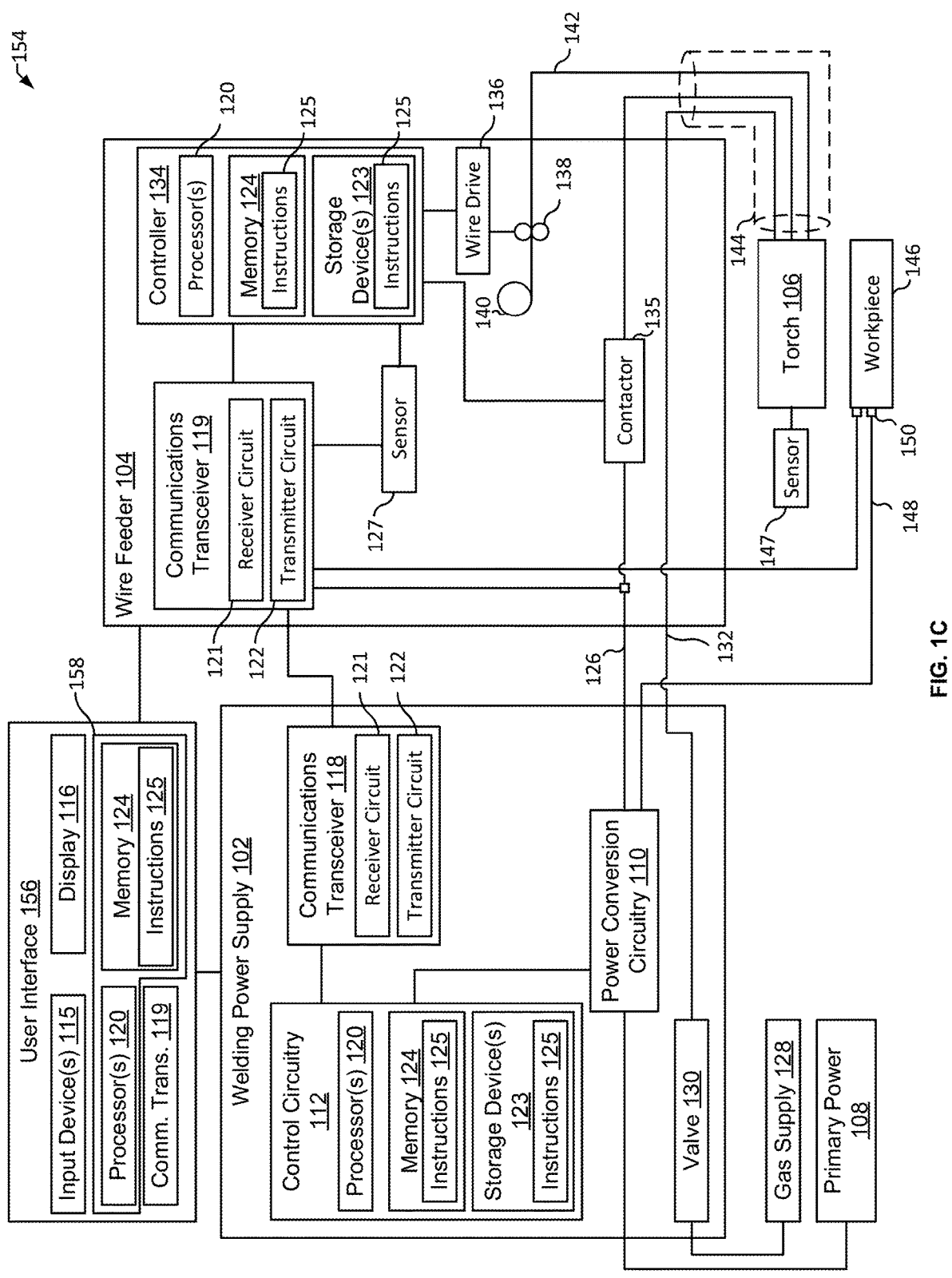
FIG. 1C is a schematic diagram of another example welding system including a user interface connected to a welding power supply and/or a wire feeder to configure a welding process, in accordance with aspects of this disclosure.

FIG. 1C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 1A-1C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of both the power supply and wire feeder, in some examples.

Figure 2:
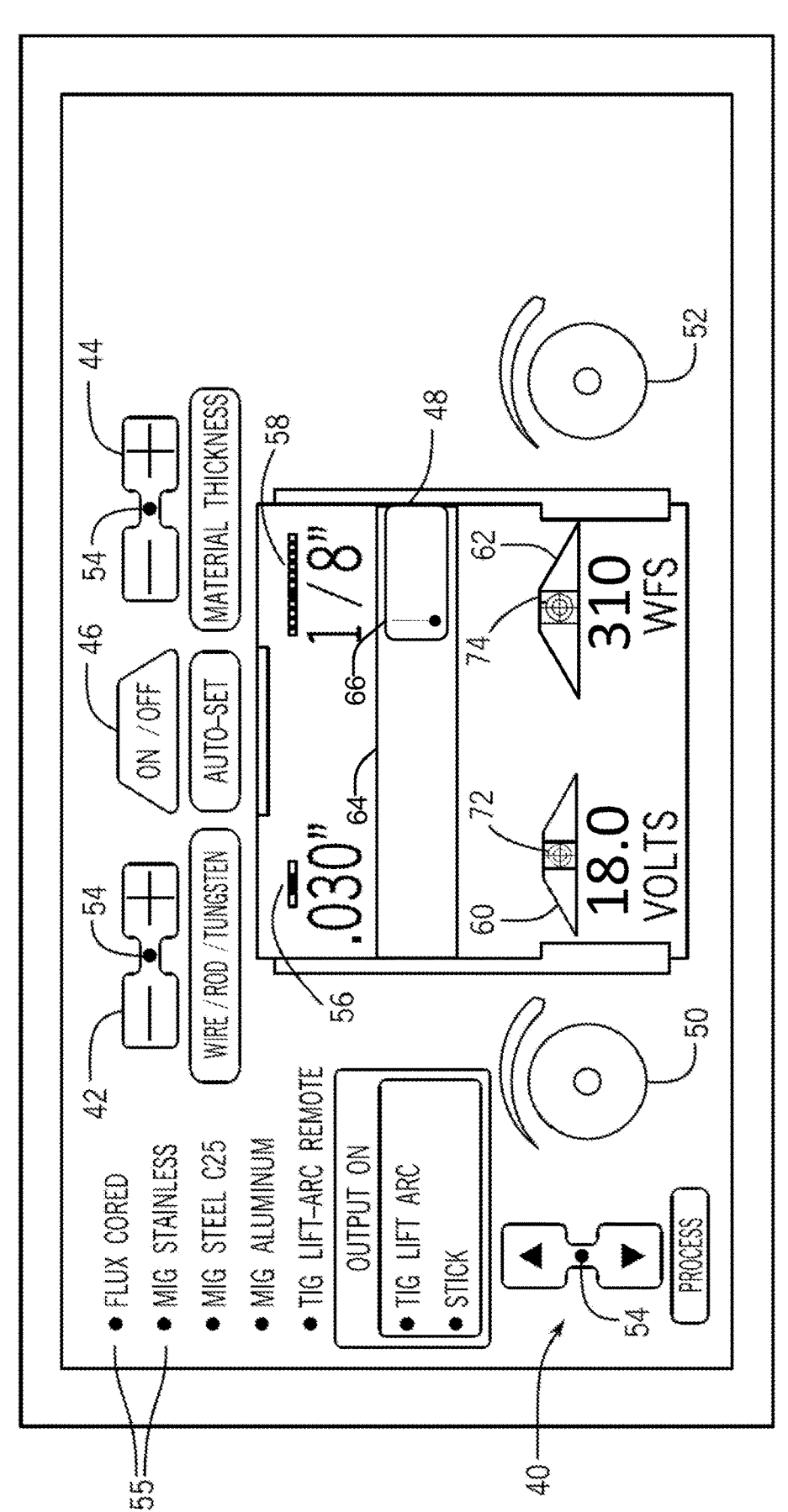
FIG. 2 is a front view of an example interface for a welding process including Auto-Set welding parameters, in accordance with aspects of this disclosure.

FIG. 2 illustrates an example user interface 114 to implement the adjustable Auto-Set procedure disclosed herein. In some examples, the welding system(s) 100, 152, 154 may implement a synergic mode (once a default or customized setting has been established), in which the control circuitry 112, controller 134, and/or controller 158, determines a voltage value in response to a wire feed speed selection via selector 52 and a predetermined relationship between the wire feed speed and the voltage. In some examples, the predetermined relationship is selected based on the weld program or one or more welding parameters, including workpiece type, workpiece thickness, etc. The control circuitry/controller may enable or disable the synergic mode based on the selected weld program (e.g., based on a selection of synergic weld process or a non-synergic weld process).

When the control circuitry/controller implements the synergic mode, the control circuitry/controller may determine a workpiece or material thickness that is recommended for the currently selected wire feed speed and/or weld program. For example, a range of wire feed speeds may be stored as a list of values associated with one or more welding parameters (e.g., voltage, current, workpiece properties) in the storage device(s) 123 and/or the memory 124 as suitable for a particular weld program and wire feed speed.

The example user interface 114 of FIG. 2 is configured to synergically adjust voltage and wire feed speed operates based on the selected wire feed speed, such that the control circuitry/controller determines the corresponding voltage associated with the weld program and/or one or more of the welding process parameter, workpiece property, the wire type parameter, the wire size parameter, or the gas type parameter based on a relationship between at least the wire feed speed and the voltage, all of which may be stored (e.g., in the storage device(s) 123, in the memory 124, etc.) in a list of values or look up table for instance. The control circuitry/circuit sets the voltage value determined based on the relationship.

As illustrated in FIGS. 2-11, user interface 114 includes a welding process selector 40, an electrode diameter adjustor 42, a material thickness adjustor 44, an Auto-Set selector 46, a color display screen 48 (e.g. incorporated with, in addition to or to substitute display 116), and welding parameter (e.g., voltage, wire feed speed, and/or amperage) adjust dials 50 and 52. FIGS. 2-11 are referenced in view of the components of user interfaces 114 and/or 156, although FIGS. 1-11 may include the same and/or different components, features, characteristics, properties, and so forth.

As shown in FIG. 2, the welding process selector 40 may allow an operator or other user to select from a plurality of welding processes. For example, the welding process selector 40 allows an operator to choose from welding processes, such as a stick welding process, a flux cored welding process, one or more metal inert gas (MIG) welding processes, one or more tungsten inert gas (TIG) welding processes, and so forth. In addition to general welding processes, in certain examples, the welding process selector 40 allows the operator to select the material of the welding electrode. For example, to implement a MIG welding process, the operator may select, for example, a stainless steel, another type of steel, or aluminum electrode for implementing the MIG process. In some examples, the welding process selector 40 allows an operator to select a desired welding process (e.g., stick, MIG, TIG, etc.), electrode material type (e.g., steel, aluminum, etc.), and gas type (e.g., C25, C100, Argon, etc.), and subsequently elect to enable the Auto-Set function of the welding system(s) 100, 152, 154 to automatically sync the appropriate voltage and wire feed speed and/or amperage welding parameters.

As provided in the example of FIG. 2, the user interface 114 includes an electrode diameter adjustor 42 (e.g., an electrode wire, an electrode rod, or tungsten electrode, depending on the type of welding process type selected). The electrode diameter is one selectable welding parameter for performing welds, as the suitable amperage of the welding arc is dependent upon the diameter of the electrode wire. In certain examples, the electrode diameter adjustor 42 features, for example, a "+" pushbutton to increase the electrode diameter setting and a "−" pushbutton to decrease the electrode diameter setting. Similarly, the user interface 114 may also include a material thickness adjustor 44, which, for example, includes a "+" pushbutton to increase the material thickness setting (e.g., relating to the work piece 146 that is being welded upon) and a "−" pushbutton to decrease the material thickness setting. The electrode diameter and material thickness settings, in conjunction, have an effect on the voltage and amperage (e.g., electrical current) to perform a given welding procedure.

In some examples, an operator or other user may select the Auto-Set function via the Auto-Set selector 46. When the Auto-Set feature is enabled (e.g., activated by the operator), the operator may input the respective electrode diameter and material thickness settings for the power supply 102 to automatically adjust (e.g., increase or decrease) a desired welding parameter, such as voltage, wire feed speed, and/or amperage parameters, to an appropriate setting.

In the example of FIG. 2, the Auto-Set selector 46 is an on/off electrical switch or on/off pushbutton, which may be activated or deactivated, allowing an operator to enable or disable the Auto-Set function of the welding system 10. In examples, the user interface 114 includes one or more light indicators 54 (e.g., LEDs in certain examples) to indicate whether the Auto-Set function is enabled or disabled. For example, in performing a MIG welding process, the operator may select the Auto-Set function, via the Auto-Set selector 46 and the one or more light indicators 54 may display a blue light, for example, or other indication to the operator that the Auto-Set function is enabled. In some examples, the welding process selector 40 may be associated with a plurality of light indicators 55, each light indicator 55 being spatially aligned with a label corresponding to a respective welding process (e.g., "FLUX CORED", "MIG STAINLESS", and so forth) such that manipulation of the welding process selector 40 changes the selected welding process, and the light indicator 55 that corresponds to the selected welding process may display a blue light, for example, or other indication to the operator that the particular welding process has been selected, while the other light indicators 55 corresponding to the other welding processes are not illuminated.

With respect to electrode diameter adjustor 42, material thickness adjustor 44, and Auto-Set selector 46, the user interface 114 includes a color display screen 48. The color display screen 48 may be any display device capable of displaying visual graphical objects and/or alphanumeric texts relating to the setting of welding parameters, real-time operational statuses of the welding system(s) 100, 152, 154 and so forth. An information bar 64 may provide instructions or alerts associated with a selected welding parameter, welding process, and/or change in such parameter or process. In the example of FIG. 2, the color display screen 48 may be capable of displaying a selected electrode diameter (e.g., 0.030"), material thickness (e.g., ⅛"), power source welding voltage (e.g., 18.0 volts), and wire feed speed (e.g., 310 inches per minute).

In some examples, the welding process selector 40, the electrode diameter adjustor 42, the material thickness adjustor 44, the Auto-Set selector 46, the welding parameter adjustment dials 50 and 52, or any combination thereof, may be displayed as graphical input devices on the color display screen 48. For example, the color display screen 48 may be a touch screen configured to receive inputs from a user via such graphical input devices that are displayed on the color display screen 48. For instance, instead of (or in addition to) actual physical input devices disposed on the user interface 114, in certain examples, other types of user input elements, such as graphical buttons, sliders, knobs, and so forth, displayed via the color display screen 48 may be used to receive inputs from a user.

In disclosed examples, when the Auto-Set selector 46 is enabled, the color display screen 48 may automatically display acceptable ranges of values of welding voltage and wire feed speed and/or amperage based upon inputs of the employed electrode diameter and/or material thickness parameters (e.g., which may be set based upon manipulation of the electrode diameter adjustor 42 and/or the material thickness adjustor 44). As used herein, an acceptable welding parameter value range may be a range of values within which the power supply 102 holds the voltage and wire feed speed and/or amperage in response to an entered or estimated value of the electrode diameter and material thickness parameters, such that a weld may be effectively executed. For example, as shown in FIG. 2, a welding operator may input an electrode diameter of 0.030" and a material thickness of ⅛" via the user interface 114. In response to the input, the power supply 102 may automatically set 18.0 volts and 310 inches per minute as appropriate welding parameter settings to execute a weld for these particular electrode diameter and material thickness characteristics. The welding parameters may then be displayed via the color display screen 48. The user interface 114 also includes welding parameter adjustment dials 50 and 52, which may be used to manually adjust (e.g., increase or decrease) the voltage and wire feed speed parameters and/or amperage parameter within desired ranges of values, depending on the particular type of welding process selected using the welding process selector 40.

In some examples, when the Auto-Set selector 46 is enabled, if there are current values for the voltage and wire feed speed parameters and/or the amperage parameter, these values may be automatically adjusted to bring them within their respective acceptable ranges of values. For example, if the current wire feed speed value is above the acceptable range of values for wire feed speed determined by the control circuitry 112 upon selection (e.g., activation) of the Auto-Set selector 46, then the wire feed speed may be automatically adjusted by the control circuitry 112 to bring the wire feed speed down to a value just within the acceptable range of values for the wire feed speed, down to a value just within a preferred subrange (e.g., a second acceptable range of values within the acceptable range of values) of the acceptable range of values for the wire feed speed, or down to desired value for the wire feed speed within the acceptable range of values. Similar adjustments may be made for current and/or voltage, as well as to bring lower values up to certain ranges or values.

In some examples, upon power-up of the welding system (s) 100, 152, 154 a message may be automatically displayed via the information bar 64 prompting an operator to enable the Auto-Set function via the Auto-Set selector 46. In the case that the operator selects the Auto-Set function by activating the Auto-Set selector 46, one or more messages may subsequently prompt the operator to select one or both of the electrode diameter and material thickness settings via the electrode diameter adjustor 42 and the material thickness adjustor 44, respectively. Similarly, messages may be automatically displayed via the information bar 64 in the case, for example, an operator changes or switches welding processes via the welding process selector 40. These messages may be displayed to render further instructions to the operator to execute the selected welding process.

In certain examples, the text of such messages may be displayed on the information bar 64 in larger than usual fonts, in colors (e.g., red, etc.) different than usual text colors (e.g., white text on a black background, or vice versa), and/or in association with colors graphics (e.g., red exclamation marks, etc.) such that the attention of the user may be better attracted. These features may provide supplemental guidance relating to appropriate welding settings (e.g., relating to shielding gases to be used, polarities to be used, and so forth) to operators or users of the welding system(s) 100, 152, 154, and thus ensure that welds are performed appropriately.

In examples, the Auto-Set function of the welding system 10 is enabled or disabled via the Auto-Set selector 46 of the user interface 114. When Auto-Set is enabled, the power supply 102 may automatically set welding voltage, welding amperage, and wire feed speed for a plurality of welding processes, electrode material types, and shielding gas types. When Auto-Set is disabled, the power supply 102 may determine acceptable ranges of values for the welding voltage, welding amperage, and wire feed speed, thus allowing an operator to manually adjust the parameters within the acceptable ranges of values. For purposes of illustration, the Auto-Set function is described with respect to MIG and/or flux cored welding processes, stick welding processes, and TIG welding processes, as depicted by FIGS. 2-11.

In an example, the Auto-Set selector 46 of the user interface 114 may be enabled to automatically set welding voltage and wire feed speed parameters for a MIG or flux cored welding process. In a MIG welding process, the appropriate setting of the welding voltage and wire feed speed parameters are presented to the operator, as the welding voltage generally determines the height and width of the weld bead, and the amperage of the weld arc is generally dependent upon the speed of the wire feed. In the case that the Auto-Set selector 46 is enabled, the operator may then select electrode diameter and material thickness via the electrode diameter adjustor 42 and the material thickness adjustor 44, respectively. The welding power supply 102 may then automatically determine the acceptable voltage and wire feed speed parameters. For example, as depicted within the color display screen 48 of FIG. 2, which displays the MIG standby state, 0.030" represents an entered value of the electrode diameter, ⅛" represents an entered value of the material thickness, and 18.0 volts and 310 inches per minute represent the automatically determined acceptable range of values for the welding voltage and wire feed speed parameters, respectively.

In some examples, as illustrated in FIG. 2, the color display screen 48 may display a plurality of discrete electrode diameter setting indicators 56 (e.g., displayed as a set of discrete points along a segmented line of a range of potentially selectable electrode diameter settings), wherein a discrete electrode diameter setting indicator 56 corresponding to the currently selected electrode diameter setting (e.g., 0.030" as illustrated in FIG. 2) is highlighted, for example, by being displayed in a relatively bright color (e.g., bright blue in certain examples) whereas all of the other discrete electrode diameter setting indicators 56 are displayed in a relatively neutral color (e.g., grey in certain examples). Accordingly, when a user selects an electrode diameter via the electrode diameter adjustor 42, the appropriate discrete electrode diameter setting indicator 56 is selected. The plurality of discrete electrode diameter setting indicators 56 are intended to aid the user to know where, within a range of potentially selectable electrode diameter settings, the currently selected electrode diameter setting is. As described herein, the number of discrete electrode diameter setting indicators 56 that are displayed by the color display screen 48 is determined based on other settings entered by the user. For example, in certain examples, based on all of the other settings entered via the user interface 114, the color display screen 48 will only display discrete electrode diameter setting indicators 56 that correspond to electrode diameter settings that make sense based on these other entered settings.

Similarly, as illustrated in FIG. 2, the color display screen 48 may display a plurality of discrete material thickness setting indicators 58 (e.g., displayed as a set of discrete points along a segmented line of a range of potentially selectable material thickness settings), wherein a discrete material thickness setting indicator 58 corresponding to the currently selected material thickness setting (e.g., ⅛" as illustrated in FIG. 2) is highlighted, for example, by being displayed in a relatively bright color (e.g., bright blue in certain examples) whereas all of the other discrete material thickness setting indicators 58 are displayed in a relatively neutral color (e.g., grey in certain examples). Accordingly, when a user selects a material thickness via the material thickness adjustor 44, the appropriate discrete material thickness setting indicator 58 is selected. The plurality of discrete material thickness setting indicators 58 are intended to aid the user to know where, within a range of potentially selectable material thickness settings, the currently selected material thickness setting is. As described herein, the number of discrete material thickness setting indicators 58 that are displayed by the color display screen 48 is determined based on other settings entered by the user. For example, in certain examples, based on all of the other settings entered via the user interface 114, the color display screen 48 will only display discrete material thickness setting indicators 58 that correspond to material thickness settings that make sense based on these other entered settings.

In the example of FIG. 2, the color display screen 48 displays graphical range indicators 60 and 62 to depict (e.g., display varying colors and/or movement of a range bar) whether the welding voltage and/or wire feed speed parameters are in the acceptable ranges of values as an operator adjusts one or both of the welding parameter adjustment dials 50 and 52. As such, when the operator makes adjustments via one (or both) of the welding parameter adjustment dials 50 and 52, the graphical range indicators 60 and 62 (which relate to the parameters being adjusted by the welding parameter adjustment dials 50 and 52, respectively) on the color display screen 48 depict acceptable ranges of values for their respective welding parameters (e.g., voltage and wire feed speed in the example illustrated in FIG. 2).

In some examples, each graphical range indicator 60, 62 represents a default welding parameter range or a welding parameter threshold range corresponding to the plateau of the trapezoidal indicator. In other words, a high value limit is represented on a first side (e.g., the right side) of each welding parameter range. A low value limit is represented on a second side (e.g., the left side) of each welding parameter range opposite the first side.

In general, when one of the welding parameter adjustment dials 50 and 52 is manipulated (e.g., the welding parameter adjustment dial 52 relating to wire feed speed being adjusted in FIG. 2), an acceptable range of values for the related welding parameter (e.g., wire feed speed in FIG. 2) is illustrated on the color display screen 48. In some examples, a graphical band or slider can be provided indicating where the present weld parameter value lies within the acceptable range (e.g., the slider 78 of the graphical range indicator 62 shown in FIG. 11). In addition, in examples, the welding parameter adjustment dials 50 and 52 may be configured to accept values that fall within the acceptable ranges of values for the welding parameters. For example, when manual adjustments are attempted via the welding parameter adjustment dials 50 and 52 that would bring their respective parameters to values outside of their respective acceptable range of values, indicated as one or more boundaries beyond which values may not be reached, such manual adjustments may be blocked by the control circuitry 112. Accordingly, attempts to adjust the value beyond the boundary limit will not be reflected on the parameters on the display screen 48. Furthermore, in certain examples, the graphical range indicators 60 and 62 may only be displayed on the color display screen 48 for a predetermined (e.g., pre-set as a setting of the welding system(s) 100, 152, 154) amount of time (e.g., 15 seconds, 10 seconds, 5 seconds, 3 seconds, or some other predetermined amount of time) after an input is received via the welding parameter adjustment dials 50 and 52.

Conversely, in the case that the Auto-Set selector 46 is disabled, the operator may then manually adjust (e.g. increase or decrease) the welding voltage and wire feed speed parameters within an acceptable range of values within the boundary limits (e.g., by manipulating the welding parameter adjustment dials 50 and 52, which correspond to the parameter displayed on the color display screen 48 directly above respective welding parameter adjustment dial 50 and 52). As such, depending on the welding parameter adjustment dials 50 and 52 that are being manipulated, either of the graphical range indicators 60 and 62 may include a reticle 72 or 74, and/or a slider (e.g., slider 78 of FIG. 11) within its respective acceptable range graphic.

As described herein, in some examples, the reticles 72, 74 and/or the sliders 78 may be displayed in varying colors to aid the user in ascertaining how to adjust the welding parameter adjustment dial 50 and 52. For example, in certain examples, the reticles 72, 74 may be displayed in a particular color (e.g., blue in certain examples) and the sliders 78 may be displayed in different colors than the reticles 72, 74 such that the user may easily distinguish the two situations. In addition, it is noted that the acceptable range graphics may include three distinct segments in certain examples. For example, the middle segment of the acceptable range graphics may correspond to a "preferred" subset (e.g., subrange) of the acceptable range of values (e.g., at the plateau of the trapezoidal indicator), as determined by the control circuitry 112, 154, whereas the two sloped side segments (e.g., on the right and left of the plateau) of the acceptable range graphics may correspond to values that are still within the acceptable range of values, but are not as preferred.

Figures 3, 4:
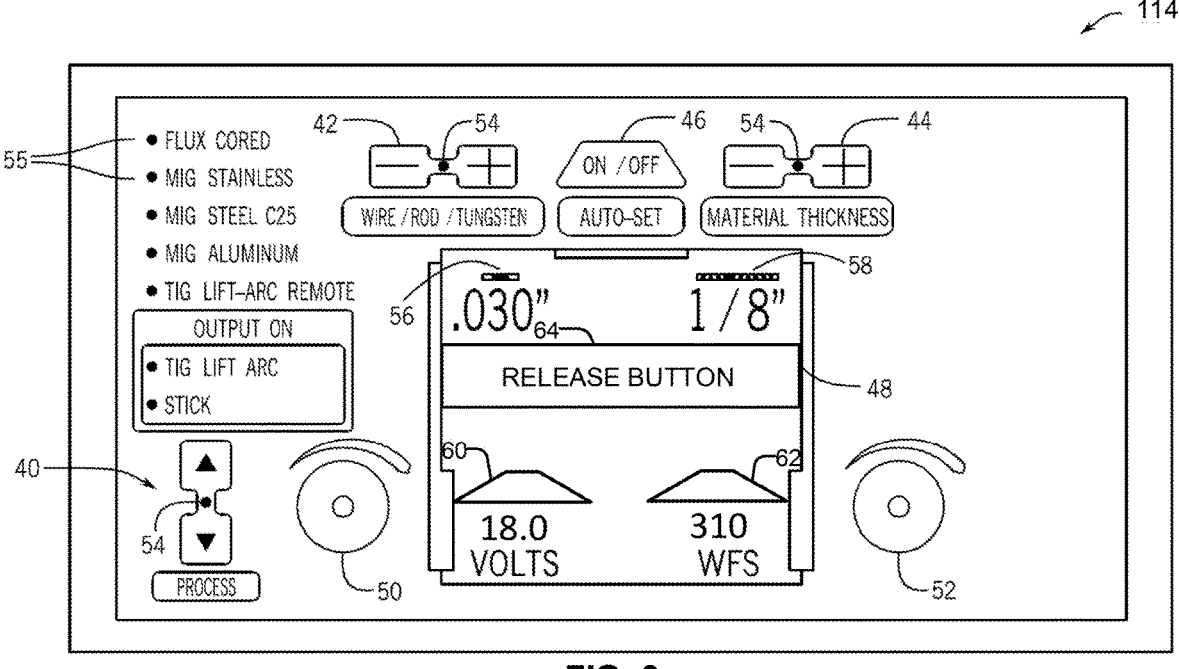
FIGS. 3-7 provide a series of representative example interfaces implementing a configurable welding process, in accordance with aspects of this disclosure.

As shown in the figures, FIGS. 2-7 provide a series of representative example interfaces implementing a configurable welding process. For example, FIG. 2 represents a display at the initiation of a welding process. From the display provided at FIG. 2, an operator would press and hold the Auto-Set selector 46. As shown in FIG. 3, the reticles 702 and 74 are removed from the display 48, indicating the welding process is no longer operating under default welding parameters. The information bar 64 provides instructions to release the Auto-Set selector 46. Once released, as shown in FIG. 4, the information bar 64 instructs the operator to one of tap the Auto-Set selector 46 (to save an adjusted one or more welding parameters) or hold the Auto-Set selector 46 for a predetermined amount of time (e.g., one or more seconds; to return the welding parameters to the default or factory settings).

Figures 5, 6:
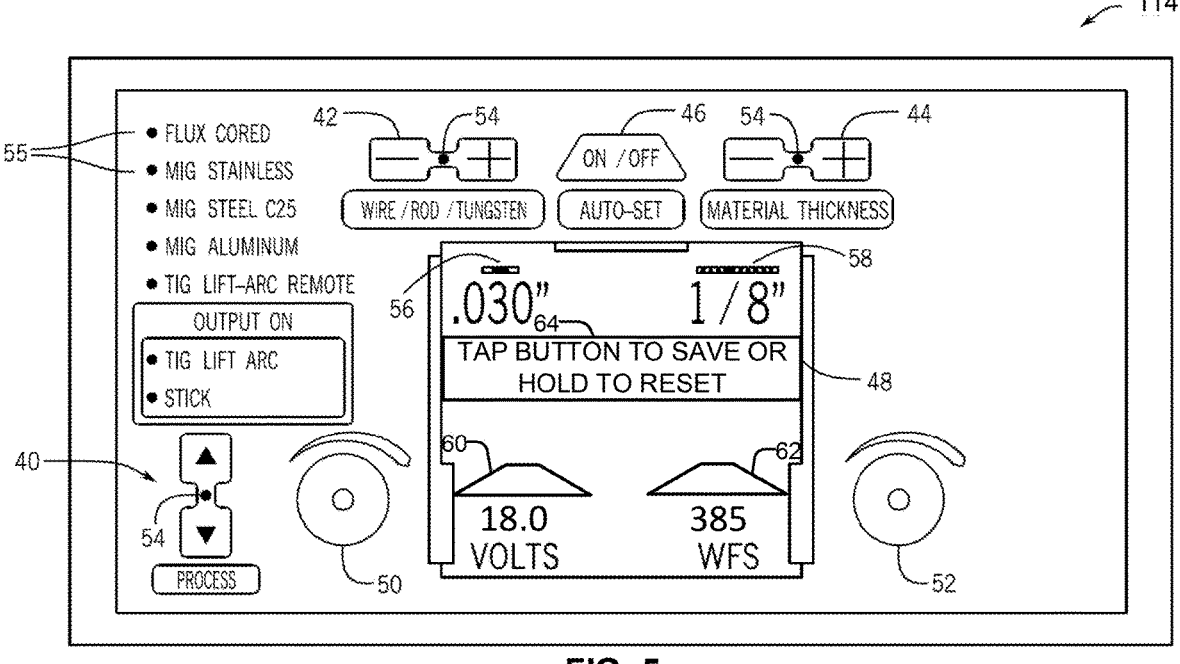

As shown in FIG. 5, the operator has adjusted the wire feed speed from 310 inches per minute to 385 inches per minute, such as by adjusting the interface 52. Having reached the desired welding parameter setting (385 IPM), the operator taps the Auto-Set selector 46, prompting the information bar 64 to indicate the new setting has been saved in FIG. 6. As shown in FIG. 6, once the new setting has been saved, the reticles 72, 74 reappear on the graphical range indicators 60, 62, to indicate that the displayed present welding parameter settings (e.g., 18.0 volts, 385 IPM wire feed speed) are the set values, which may be synergistically linked.

Figure 7:
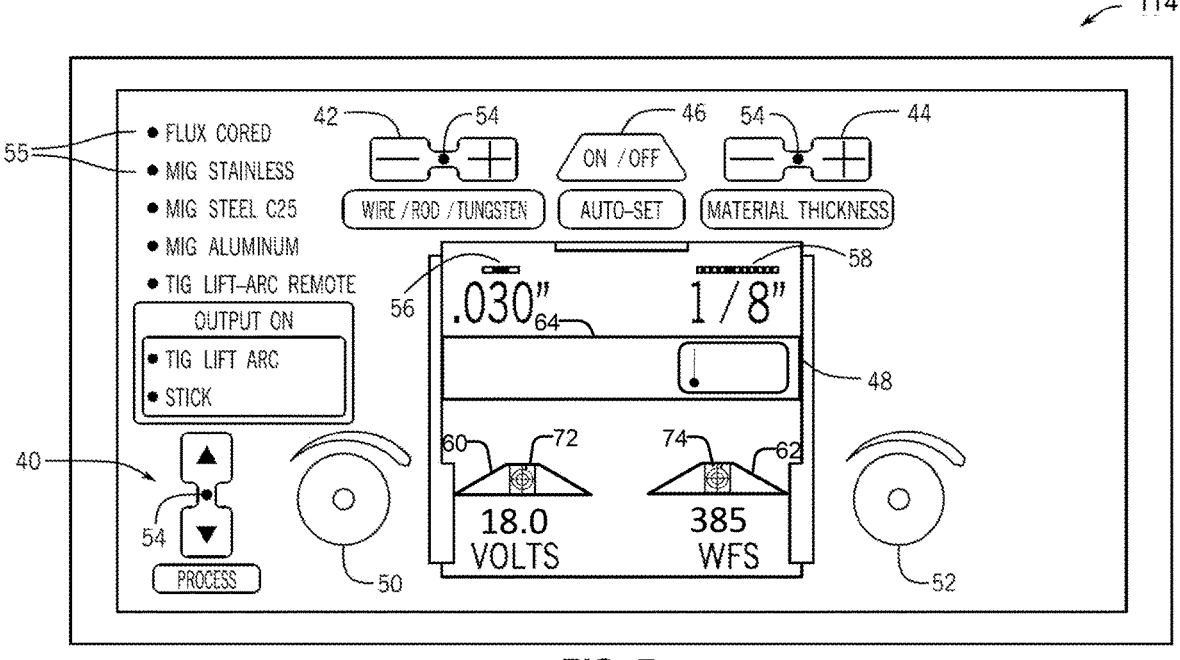

FIG. 7 thus illustrates interface 114 during a welding operation, with indicators displayed similar to FIG. 2 except for the adjusted wire feed speed, indicating the configurable setting. There may be a time lag (e.g., one or more seconds), an instruction to confirm the adjustment, and/or other mechanism to ensure and/or indicate the adjusted welding parameter setting is accepted. In some examples, once accepted, the configurable welding parameter settings control such that the operator should take additional actions to either reverse the procedure (return to default welding parameter settings) and/or further adjust the welding parameters. For example, the operator may repeat the actions provided with respect to FIGS. 2-7 to further adjust one or more welding parameters to, for instance, further adjust the wire feed speed. In some examples, once the desired settings are saved, the operator may further adjust the welding parameters, such as via welding parameter adjustment dials 50 and 52.

In some examples, the range of values the operator may select from is limited, such as by the control circuitry. For example, once a value is selected, either from the default welding parameter settings or a customized value, boundaries are assigned by the control circuitry beyond which the selection device will not allow increasing or decreasing the welding parameter value. In some examples, these adjustment boundaries may correspond to a percentage of the selected welding parameter value (e.g., 1-10 percent of the parameter value). In some examples, the one or more adjustment boundaries corresponds to a predetermined value (e.g., +/−5 volts; +/−30 IPM; etc.).

Figure 8:
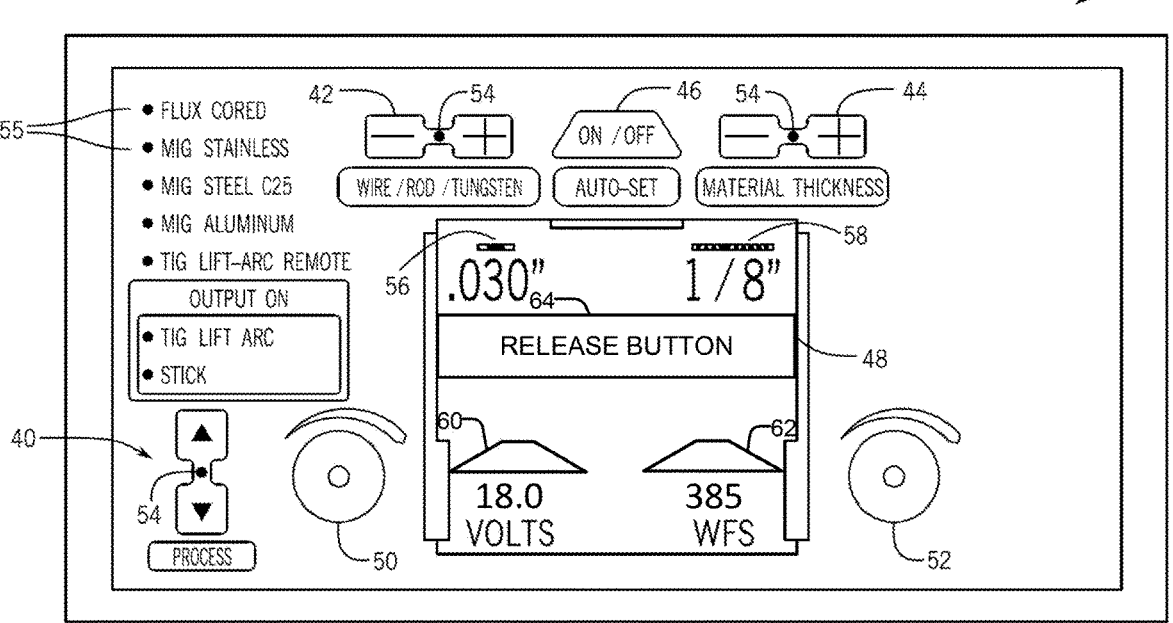
FIGS. 8-10 provide a series of representative example interfaces implementing a default welding process, in accordance with aspects of this disclosure.
Figures 9, 10:
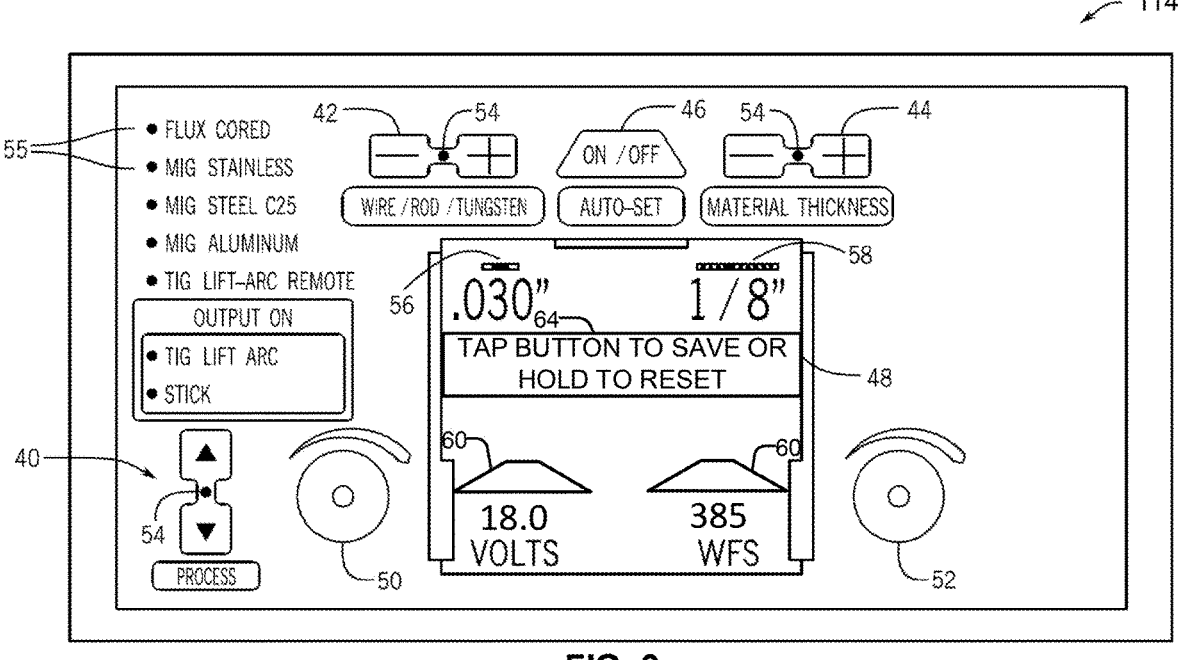

In the event the operator desires to return the welding parameter settings to the default values, the procedure can be reversed as provided with reference to FIGS. 8-10. From FIG. 7, an operator presses and holds the Auto-Set selector 46. As shown, the information bar 64 provides an instruction to release the button (such as after a predetermined amount of time), and the reticles 72, 74 on the graphical range indicators 60, 62 are removed from display 48. Upon release of the Auto-Set selector 46, the information bar 64 instructs the operator to tap the button to save a setting or hold the button to force a reset to the default welding parameter settings, as shown in FIG. 8. In the example of FIG. 9, the operator held the Auto-Set selector 46 for a predetermined amount of time (such as one or more seconds), which returns the wire feed speed back to 310 IPM. As shown, the reticles 72, 74 reappear, indicating the settings have returned to the default welding parameter settings.

In FIG. 10, the display 48 returns to the default display settings, similar to those provided in FIG. 2, including a heat indicator 66, which represents the temperature of the system 100, 152, 154 during a welding operation. Additionally or alternatively, the heat indicator 66 can be displayed with varying characteristics, such as changing colors to indicate a relative change in temperature (e.g., blue indicates a cold or dropping temperature, whereas red indicates a high or increases temperature). In some examples, the heat indicator can provide indications of various components and/or the environmental temperature. In examples, the displayed indicator can be selected by the operator.

Although one or more example input types have been disclosed with some examples disclosed herein, these and other types of inputs can be employed to implement the actions provided. For example, an input can be one or more of a tap, a double tap, or holding the input device for a predetermined amount of time. In some examples, the type of input corresponds to a different function of a respective device or welding parameter.

Figure 11:
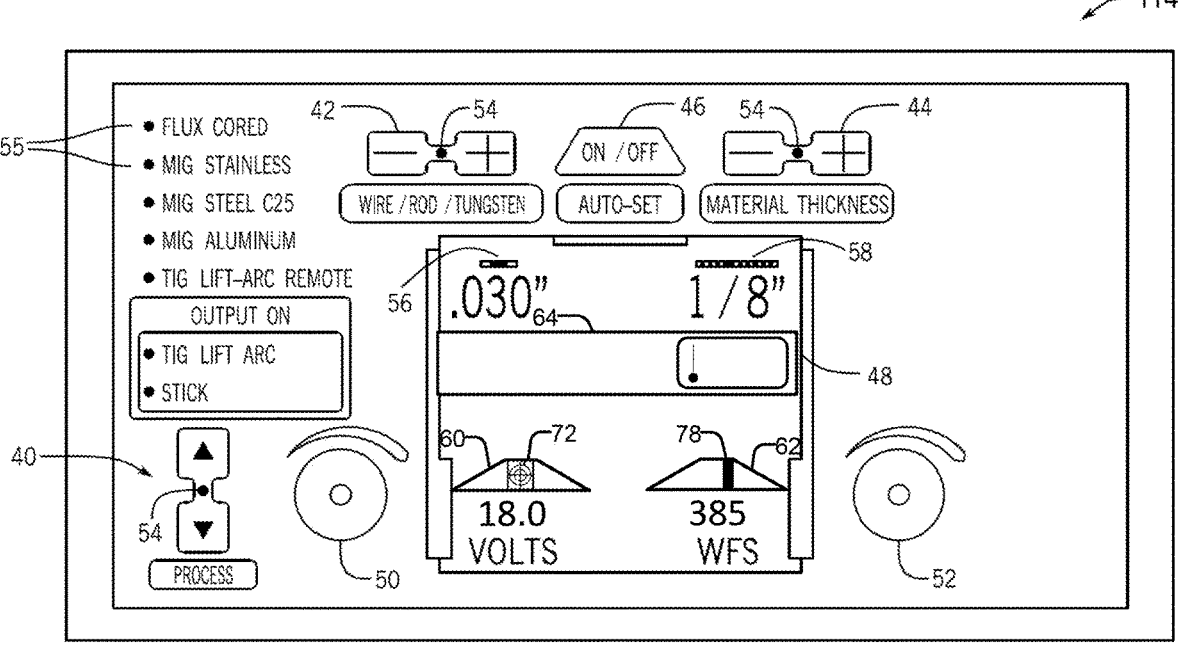
FIG. 11 is another front view of an example interface for a welding process including Auto-Set welding parameters, in accordance with aspects of this disclosure.

In the example shown in FIG. 11, when the sliders 78 are within the middle segment of the acceptable range of values, the sliders 78 may be displayed in a first color (e.g., green in certain examples), whereas when the sliders 78 are within the side segments of the acceptable range of values, the sliders 78 may be displayed in a second color (e.g., yellow in certain examples) to denote that the currently selected value is no longer within the preferred subset of the acceptable range of values but is still within the acceptable range of values. Although the example of FIG. 11 shows slider 78 associated with the wire feed speed on graphical range indicator 62, in some examples one or more sliders can be displayed on each graphical range indicator 60, 62 to illustrate a variable or adjustable value for the relevant welding parameter.

Furthermore, in certain examples, when the sliders 78 reach the outer bounds of the acceptable range of values (e.g., the downward slopes of the trapezoidal graphical range indicators 60, 62), the sliders 78 may be displayed in a third color (e.g., red in certain examples) to denote that the currently selected value is no longer within the acceptable range of values. In other examples, the color of the sliders 78 may vary based on the magnitude of the current value for the respective parameter. For example, if the current amperage value is at a lower end of its acceptable range of values, the color of the respective slider 78 may be blue, whereas if the current amperage value is at a higher end of its acceptable range of values, the color of the respective slider 78 may be red, and while the amperage value changes from the lower end to the higher end, the color of the respective slider 78 may gradually transition between blue and red. Such an example would be intended to convey a relative amount of heat input into the welding application.

Additionally or alternatively, one or more program indicators and/or selectors can be provided on the interface 114, 152, 154. In this example, once a welding parameter setting or compliment of welding parameter settings has been saved, the operator can assign it to a memory (e.g., a saved configuration corresponding to a first saved weld setting, a second saved weld setting, etc.). In this manner, having achieved a desired weld setting (e.g. for a particular welding process, tool, type, etc.), the operator can save the particular setting and return to it when needed.

Figure 12A:
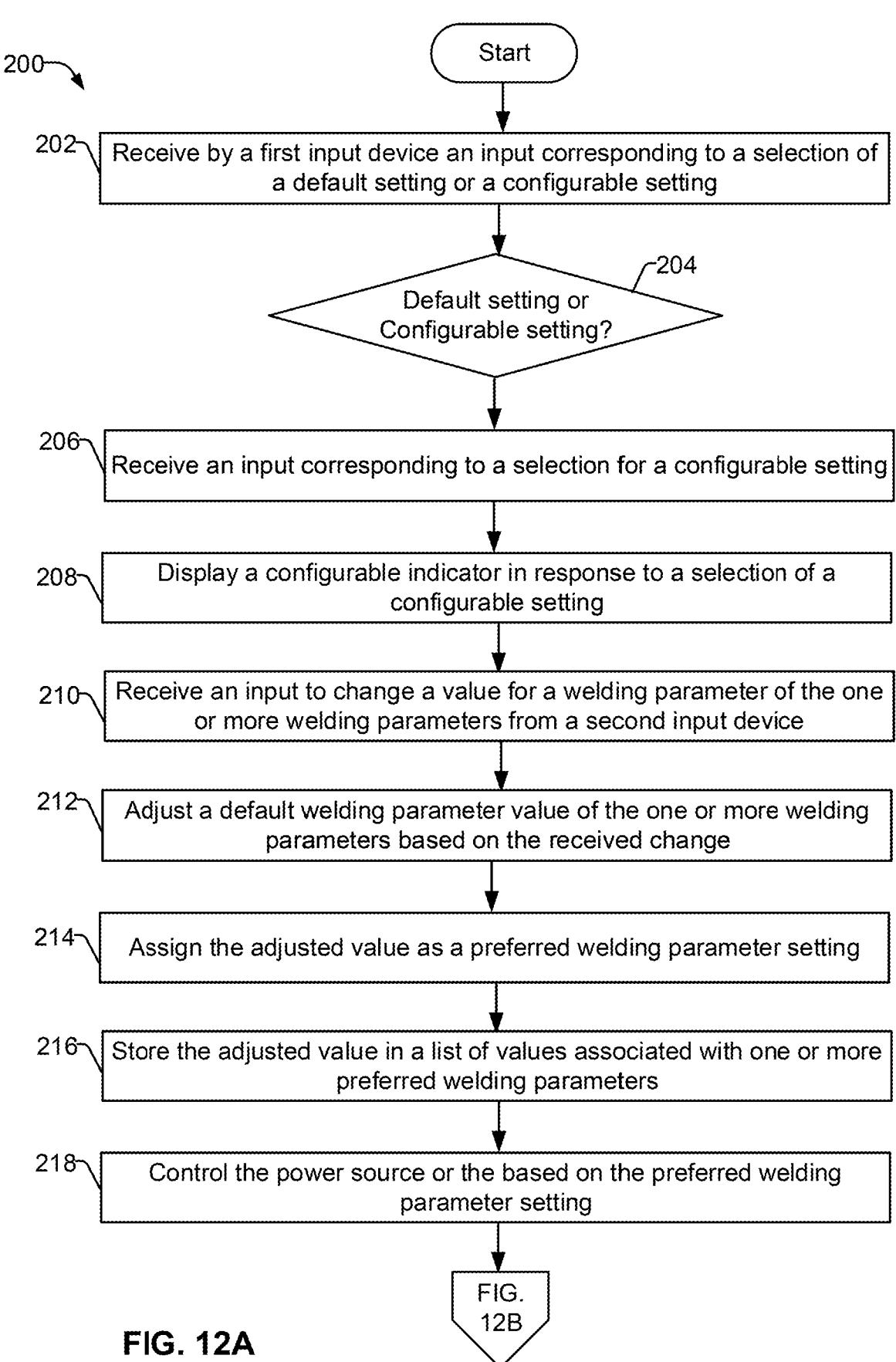

FIGS. 12A and 12B provide a flowchart representative of example machine readable instructions 200 which may be executed by the example welding system 100 of FIG. 1A, the example welding system 152 of FIG. 1B, and/or the example welding system 154 of FIG. 1C, to configure one or more graphical user interfaces during a welding process. The example instructions 200 may be stored in the storage device(s) 123 and/or the memory 124 and executed by the processor(s) 120 of the control circuitry 112. The example instructions 200 are described below with reference to the example graphical user interfaces of FIGS. 1 through 11. As provided in the flowchart, blocks 202 to block 218 provided in FIG. 12A represent establishing a configurable setting, whereas blocks 220 to block 230 provided in FIG. 12B represent establishing a default setting.

In block 202, receive by a first input device an input corresponding to a selection of a default setting or a configurable setting for the one or more welding parameters. In block 204, a control circuitry determines whether the selection corresponds to a default setting or a configurable setting for the one or more welding parameters. In block 206, receive, at the control circuitry (e.g., control circuitry 112, 152, 154), an input corresponding to a selection for a configurable setting from a first input device (e.g., Auto-Set selector 46). In block 208, the display device displays a configurable indicator in response to a selection of a configurable setting.

In block 210, receive, at control circuitry, an input corresponding to a change in value for a welding parameter of the one or more welding parameters from a second input device (e.g., selector(s) 50, 52). In block 212, adjust, via the control circuitry, a value of a welding parameter from a default welding parameter value of the one or more welding parameters based on the received change. In block 214, assign, by the control circuitry, the adjusted value as a preferred welding parameter setting. In block 216, store the adjusted value in a list of values associated with one or more preferred welding parameters (e.g., in storage device(s) 123 and/or the memory 124). In block 218, control, via the control circuitry, the power source to deliver power or the welding wire feeder to advance the electrode wire based on the preferred welding parameter setting.

In block 220, receive an input at the first input device corresponding to a selection of a default setting or a configurable setting for the one or more welding parameters. In block 222, determine, at the control circuitry, whether the selection corresponds to a default setting or a configurable setting for the one or more welding parameters. In block 224, receive, at the control circuitry, an input corresponding to a selection for a default welding parameter setting from the first input device. In block 226, a display device (e.g., display 48) displays a default indicator (e.g., reticle(s) 72, 74) in response to selection of a default setting. In block 228, access, by the control circuitry, the default welding parameter settings from a list of values associated with one or more default welding parameters (e.g., in storage device(s) 123 and/or the memory 124). In block 230, control, by the control circuitry, the power source to deliver power or the welding wire feeder to advance the electrode wire based on the default welding parameter setting.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of rate of current rise for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to an engine-driven stick welder, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
   a power source configured to deliver power to a welding torch based on one or more welding parameters;
   a welding wire feeder configured to advance a wire electrode to the welding torch based on the one or more welding parameters;
   an interface comprising:
       a first input device configured to receive an input corresponding to a selection of a default setting or a configurable setting for the one or more welding parameters;
       a display device configured to display a default indicator in response to selection of a default setting or a configurable indicator in response to a selection of a configurable setting; and
       a second input device configured to receive an input relating to a change in value of the one or more welding parameters; and
   control circuitry configured to:
       receive an input corresponding to a selection for a configurable setting from the first input device;
       enable the second input device to receive an input in response to selection of the configurable setting;
       display the configurable indicator corresponding to the selection for the configurable setting on the interface;
       receive an input corresponding to a change in value for a welding parameter of the one or more welding parameters from the second input device;
       adjust a value of a welding parameter from a default welding parameter value of the one or more welding parameters based on the received change;
       assign the adjusted value as a preferred welding parameter setting and store the adjusted value in a list of values associated with one or more preferred welding parameters;
       control the power source to deliver power or the welding wire feeder to advance the electrode wire based on the preferred welding parameter setting;
       receive an input corresponding to a selection for a default welding parameter setting from the first input device after controlling the power source to deliver power or the welding wire feeder to advance the electrode wire based on the preferred welding parameter setting;
       display the default indicator corresponding to the selection for the default welding parameter setting on the interface;
       access the default welding parameter settings from a list of values associated with one or more default welding parameters; and
       control the power source to deliver power or the welding wire feeder to advance the electrode wire based on the default welding parameter setting.

2. The welding system of claim 1, wherein the control circuitry is further configured to apply one or more adjustment boundaries such that an adjustment to the default welding parameter value is limited by the one or more adjustment boundaries.

3. The welding system of claim 2, wherein the one or more adjustment boundaries corresponds to a predetermined value.

4. The welding system of claim 1, wherein the interface further comprises a graphical range indicator to represent a default welding parameter range or a welding parameter threshold range, such that a high value limit is represented on a first side of the default welding parameter range and a low value limit is represented on a second side of the default welding parameter range opposite the first side.

5. The welding system of claim 1, wherein the default indicator comprises a graphical reticle indicating selection of a default welding parameter.

6. The welding system of claim 1, wherein the configurable indicator comprises a graphical band indicating selection of a configurable welding parameter.

7. The welding system of claim 6, wherein a location of the graphical band on the graphical range indicator corresponds to a value of the configurable welding parameter relative to a range of default welding parameters.

8. The welding system of claim 1, wherein a type of input is one of a tap, a double tap, or holding the input device for a predetermined amount of time, the type of input corresponding to a different function of a respective device.

9. The welding system of claim 1, wherein the control circuitry is further configured to control the power source to deliver power according to one or more welding processes, each welding process of the one or more welding processes corresponding to one or more configurable settings.

10. The welding system of claim 9, wherein the one or more welding parameters includes one or more of voltage, current, power, wire feed speed, gas flow rate, pulse rate, workpiece thickness, workpiece material type, electrode type, welding process, travel speed, arc length, or joint type.

11. A welding system, comprising:
a power source configured to deliver power to a welding torch based on one or more welding parameters;
a welding wire feeder configured to advance a wire electrode to the welding torch based on the one or more welding parameters, wherein the one or more welding parameters includes a voltage or a wire feed speed;
an interface comprising:
a first input device configured to receive an input corresponding to a selection of a default setting and to receive an input corresponding to a configurable setting for the one or more welding parameters;
a display device configured to display a default indicator in response to selection of a default setting and to display a configurable indicator in response to a selection of a configurable setting;
a voltage selection knob configured to receive an input relating to the voltage provided to the welding torch;
a wire feed speed selection knob configured to receive an input relating to the wire feed speed from the welding wire feeder; and
control circuitry configured to:
receive an input corresponding to a selection for a configurable setting from the first input device;
enable the control circuitry to receive an input from the voltage selection knob or the wire feed speed selection knob in response to selection of the configurable setting;
receive an input corresponding to a change in value for one or more of the voltage or the wire feed speed from the voltage selection knob or the wire feed speed selection knob;
adjust the value of the voltage or the wire feed speed based on the received change;
assign the adjusted value of the voltage or the wire feed speed as a preferred welding parameter setting and store the adjusted value in a list of values associated with one or more preferred welding parameters;

control the power source to deliver power or the welding wire feeder to advance the electrode wire based on the preferred welding parameter setting;
receive an input corresponding to a selection for a default welding parameter setting from the first input device;
access the default welding parameter settings from a list of values associated with one or more default welding parameters; and
control the power source to deliver power or the welding wire feeder to advance the electrode wire based on the default welding parameter setting.

12. The welding system of claim 11, wherein further comprising an information bar to display graphics or text to the operator, the graphics or text providing instructions or responses corresponding to the user input.

13. The welding system of claim 11, wherein the interface further comprises a welding process type input device configured to receive an input relating to a welding process type, wherein the range of values for the power output and the default welding parameter values are calculated based at least in part on the welding process type.

14. The welding system of claim 13, wherein the welding process type input device comprises a selectable option of one or more of a metal inert gas (MIG) or a tungsten inert gas (TIG) welding process as the welding process type.

15. The welding system of claim 11, wherein the interface comprises a workpiece input device configured to receive input relating to the material thickness of the workpiece, wherein the control circuitry is further configured to determine the default welding parameter values based on the material thickness.

16. The welding system of claim 11, wherein the interface further comprises a first graphical range indicator with an indication of a present value of the voltage, and a second graphical range indicator with an indication of a present value of the wire feed speed.

17. The welding system of claim 16, wherein the control circuitry is further configured to update the indication of the present value of the parameter for the voltage in response to an input received via the voltage input device and to update the indication of the present value of the wire feed speed in response to an input received via the wire feed speed input device.

18. The welding system of claim 11, wherein the control circuitry is further configured to apply one or more adjustment boundaries such that an adjustment to the default welding parameter value is limited by the one or more adjustment boundaries.

19. A welding system, comprising:
a power source configured to deliver power to a welding torch based on one or more welding parameters;
a welding wire feeder configured to advance a wire electrode to the welding torch based on the one or more welding parameters;
an interface comprising:
a first input device configured to receive an input corresponding to a selection of a default setting or a configurable setting for the one or more welding parameters;
a display device configured to display a default indicator in response to selection of a default setting or a configurable indicator in response to a selection of a configurable setting; and
a second input device configured to receive an input relating to a change in value of the one or more welding parameters; and control circuitry configured to:

receive an input corresponding to a selection for a configurable setting from the first input device;

receive an input corresponding to a change in value for a welding parameter of the one or more welding parameters from the second input device;

adjust a value of a welding parameter from a default welding parameter value of the one or more welding parameters based on the received change;

assign the adjusted value as a preferred welding parameter setting and store the adjusted value in a list of values associated with one or more preferred welding parameters;

control the power source to deliver power or the welding wire feeder to advance the electrode wire based on the preferred welding parameter setting;

receive an input corresponding to a selection for a default welding parameter setting from the first input device;

access the default welding parameter settings from a list of values associated with one or more default welding parameters; and control the power source to deliver power or the welding wire feeder to advance the electrode wire based on the default welding parameter setting.

* * * * *